(12) United States Patent
Fukushima

(10) Patent No.: US 6,251,155 B1
(45) Date of Patent: Jun. 26, 2001

(54) AUTOMATIC WAREHOUSE FOR SUPPLYING AIR TO A CLEAN AIR SPACE

(75) Inventor: Masazumi Fukushima, Nishi Kasugai-gun (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/280,696

(22) Filed: Mar. 30, 1999

(30) Foreign Application Priority Data

Jul. 2, 1998 (JP) .................................................. 10-204472

(51) Int. Cl.[7] .................................................. B01D 35/30
(52) U.S. Cl. .............................. 55/385.2; 55/416; 55/471; 55/473; 454/187
(58) Field of Search ................... 55/385.2, 471, 55/473, 484, 416; 454/187

(56) References Cited

U.S. PATENT DOCUMENTS 5,525,106 * 6/1996 Iizuka et al. .......................... 454/187

FOREIGN PATENT DOCUMENTS

| 3-172203 | * 7/1991 | (JP) | ...................................... 454/187 |
| 7-172506 | 7/1995 | (JP) . | |
| 9-150912 | 6/1997 | (JP) . | |
| 10-291607 | * 11/1998 | (JP) . | |

* cited by examiner

Primary Examiner—David A. Simmons
Assistant Examiner—Robert A. Hopkins

(57) ABSTRACT

To supply clean air throughout entire racks even if the height of the racks in an automatic warehouse is increased. A blower motor 18 is provided at the bottom of racks 10 and 11 to suck air in a loading space 12 and supply it to a clean air path 20. In addition, air flows from a ceiling clean fan unit 8 to the racks 10 and 11 via an air intake port 24, and the air flowing from the racks 10 and 11 to the loading space 12 is sucked by means of a blower motor 18.

19 Claims, 3 Drawing Sheets

AUTOMATIC WAREHOUSE FOR SUPPLYING AIR TO A CLEAN AIR SPACE

BACKGROUND OF THE INVENTION

1. Field of the Invention

The present invention relates to an automatic warehouse for a clean room, and specifically to the supply and circulation of clean air to the automatic warehouse.

2. Description of the Related Art

In an automatic warehouse for a clean room, a fan is provided at the bottom of a rack, and air is sucked from the outside of the automatic warehouse and is treated by means of a clean filter, and clean air is supplied to each rack from a path provided at the rear of the rack. However, if the ceiling height of the clean room is increased, the rack height of the automatic warehouse is likely to increase, and there is concern that the clean air from the fan does not reach the top of the rack.

It is an object of the present invention to permit clean air to be supplied almost uniformly to each rack even if the height of the rack is increased.

SUMMARY OF THE INVENTION

The present invention relates to an automatic warehouse provided with a wall facing the outside rear of the rack for forming a clean air path to the rack, and the invention comprises an air intake port for introducing clean air from the ceiling section of a clean room at a top of the clean air path, and an air supply means and a filter for sucking and purifying air from the loading space, and for supplying air to the clean air path, wherein the air supply means and the filter are provided at the bottom of the rack.

Preferably, the above automatic warehouse is disposed so as to penetrate through at least two floors of the clean room, and has an entrance for carrying an article of each floor in and out.

Preferably, the air supply means is constructed so as to eject a part of the sucked air to the outside of the automatic warehouse.

The present invention comprises an air intake for introducing clean air from the ceiling section of a clean room at the top of a clean air path, and an air supply means and a filter for sucking and purifying air from the loading space, and for supplying air to the clean air path, wherein the air supply means and the filter are provided at the bottom of the rack. Thus, at the upper part of the rack, the clean air from the ceiling section of the clean room is supplied via the clean air path. The air supplied from the clean air path to the rack flows into the loading space, is sucked by the air supply means at the bottom of the rack, and is treated by means of the filter, and is then returned to the clean air path. Therefore, the clean air from the ceiling section is supplied to the upper part of the rack, and the clean air from the air supply means and the filter is supplied to the lower part of the rack. Because the air in the loading space is sucked by the air supply means, the flow of clean air at the upper part of the rack is accelerated, and making it possible to prevent non-circulating air from settling in the upper part of the rack. As a result, clean air can be supplied almost uniformly at the whole rack.

Even if the height of the rack increases, the clean air can be supplied uniformly. Thus, the present invention provides an automatic warehouse whose height is substantially equivalent to the full height of two floors of the clean room, for example. The lower end of the automatic warehouse comes into contact with the floor of the clean room to which grating or the like is applied on the lower floor, and the upper end thereof reaches the vicinity of the ceiling of the upper floor. By doing this, an article between the first and second floors of the clean room can be carried in the automatic warehouse. In comparison with the case in which one automatic warehouse is provided on each floor, only one loading device is employed, thus making it possible to reduce the dead space at the lower part of the automatic warehouse or in the vicinity of the ceiling.

In the present invention, a part of the sucked air from the loading space is ejected to the outside of the warehouse via the floor surface of the automatic warehouse or the lower wall surface. The amount of clean air brought in from the ceiling section is equal to that ejected from the automatic warehouse to the outside, thus making it possible to increase the clean air intake quantity.

DETAILED DESCRIPTION OF THE PREFERRED EMBODIMENTS

Figure 1:
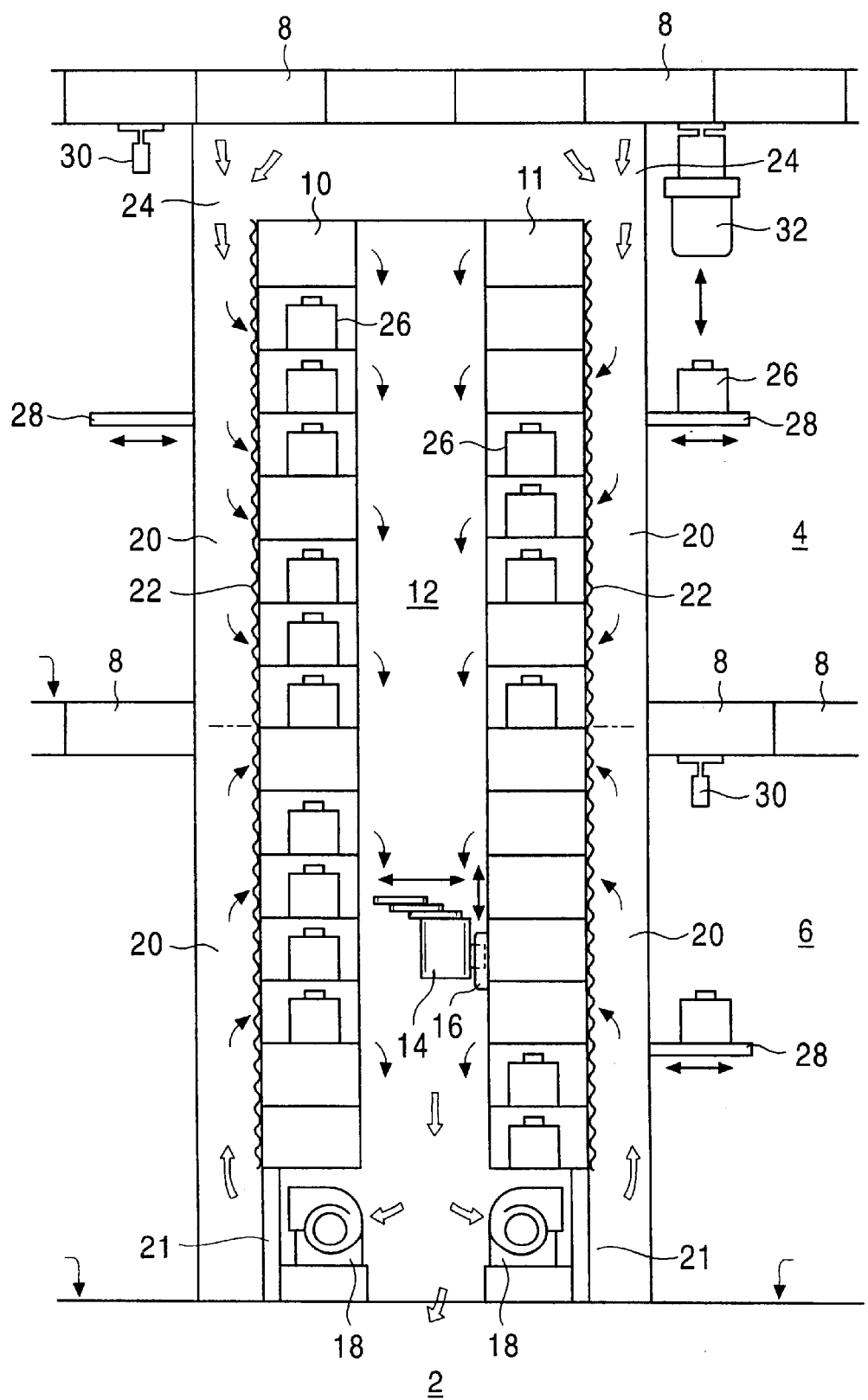
FIG. 1 is a drawing showing the structure of an automatic warehouse according to an embodiment of the present invention.
Figure 4:
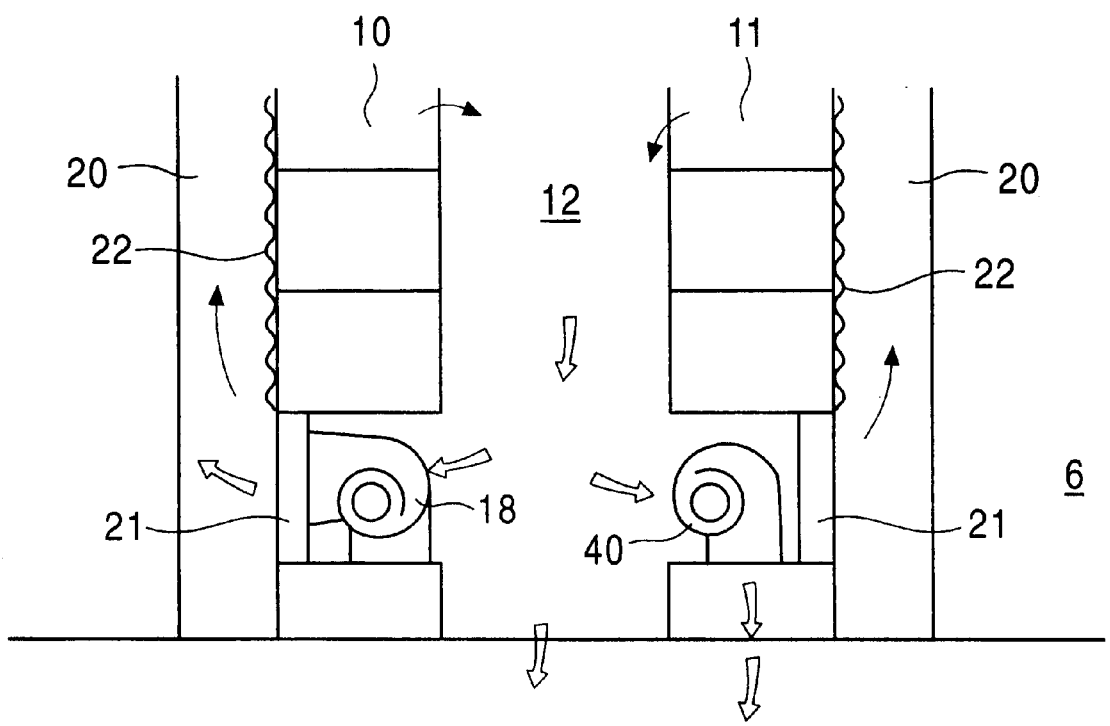
FIG. 4 is a drawing showing an example where air is ejected to the outside of an automatic warehouse according to a third modified embodiment.

FIG. 1 shows an automatic warehouse 2 according to an embodiment of the present invention. In FIGS. 1, 4 is the first floor of a clean room, and 6 is the second floor, wherein clean air is blown out from the ceiling of each of the floors 4 and 6 to the floor surface via a clean fan unit 8. On the floor surface of each floor, grating or the like (not shown in the drawing) is applied, and air is sucked, retreated by means of a clean fan unit as required, and supplied. The automatic warehouse 2 is basically rectangular. 10 and 11 are a pair of racks with multiple steps and multiple arrays, between which a loading space 12 is provided for the purposes of elevating a loading device 14 and moving it horizontally. Although FIG. 1 shows the racks 10 and 11 with one array only, plural arrays are actually provided. In addition, the racks may be provided at both ends of the loading space 12. 16 is an elevating rail that is elevated along the front face of the rack 11. The loading device 14 travels while being supported by the elevating rail 16, and loads an article 26 between arbitrary points of the racks 10 and 11.

A dead space equivalent to the height of the loading device 14 is produced at the bottom of the racks 10 and 11. A blower motor 18 is provided in such space to supply air to a clean air path 20. The clean air path 20 is provided between the left and right wall faces of the automatic warehouse 2 along the respective rear faces of the racks 10 and 11. 21 is a clean filter, and 22 is a rectifying plate for supplying clean air to each of the racks 10 and 11. The blower motor 18 is disposed so as to suck the air in the loading space 12 without supplying air outside the clean air path 20 (air outside the automatic warehouse 2).

The automatic warehouse 2 approximately comes into contact with the ceiling at its top, and is provided with an air intake port 24 at the top of the clean air path 20 so as to intake the clean air from the clean fan unit 8 of the ceiling of the first floor 4. The air intake port 24 may be provided in the vicinity of the ceiling of the second floor 6 as well as the top of the clean air path 20 so as to intake the clean air from the cleaning fan unit 8 of the second floor 6.

In the automatic warehouse 2, a station 28 with a conveyer serving as an entrance for carrying the article 26 in and out is provided on each of the floors 4 and 6, so that the article 26 can be delivered between the warehouse and a ceiling traveling cart 32 or the like traveling along a rail 30 for the ceiling traveling cart 32. To prevent the opening of the automatic warehouse facing the station 28 from disturbing the flow of clean air, a shutter or the like may be provided for opening and closing a path between the stations 28 at the wall surface of the automatic warehouse 2. In the case where the station 28 is in the vicinity of the ceiling of each floor, the station 28 may be employed for clean air intake without providing such a shutter.

When the flow of air in this embodiment is as indicated by the arrow in FIG. 1, the blower motor 18 sucks the air in the loading space 12, and the sucked air is treated by means of the clean filter 21, and is supplied to the clean air path 20. Accordingly, the flow of the air from the racks 10 and 11 to the loading space 12 is accelerated, and as a result, the flow of air from the air intake port 24 to the upper part of the clean air path 20 is accelerated. Thus, even if the racks 10 and 11 are made taller, the air does not settle at the upper part thereof. The air supplied from the blower motor 18 mainly flows to shelves beneath the racks 10 and 11 via the clean filter 21 and the rectifying plate 22, and then flows to the loading space 12. As indicated by the dashed line in FIG. 1, the clean air path 20 may be partitioned into a section where the air is blown from the blower motor 18 and a section where the clean air is blown from the air intake port 24.

Moreover, part of the air in the loading space 12 is sucked from the bottom face of the automatic warehouse 2 down to the floor surface of the clean room via grating or the like, and is then treated. In this embodiment, there coexist two flows of air, that is, the flow of air circulating from the loading space 12 via the blower motor 18, the clean air path 20, and the racks 10 and 11, and the flow of air ejected via the bottom surface of the loading space 12. Accordingly, a descending flow of air is formed in the loading space 12, and the amount of air introduced from the air intake port 24 increases, thus making it possible to prevent the air from settling at the upper part of the racks 10 and 11.

Figure 2:
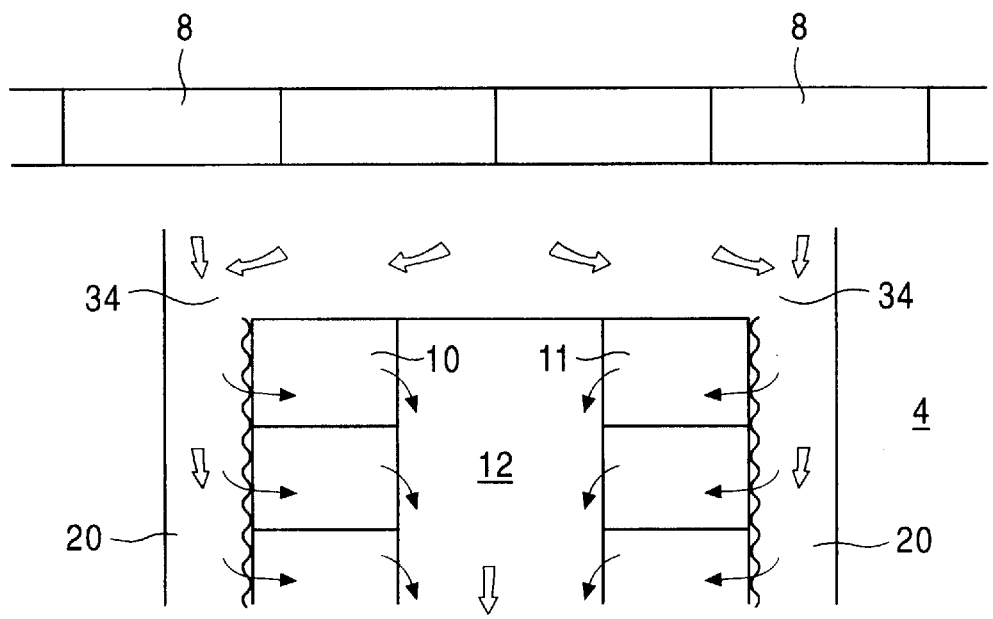
FIG. 2 is a drawing showing the air intake port of an automatic warehouse according to a modified embodiment.
Figure 3:
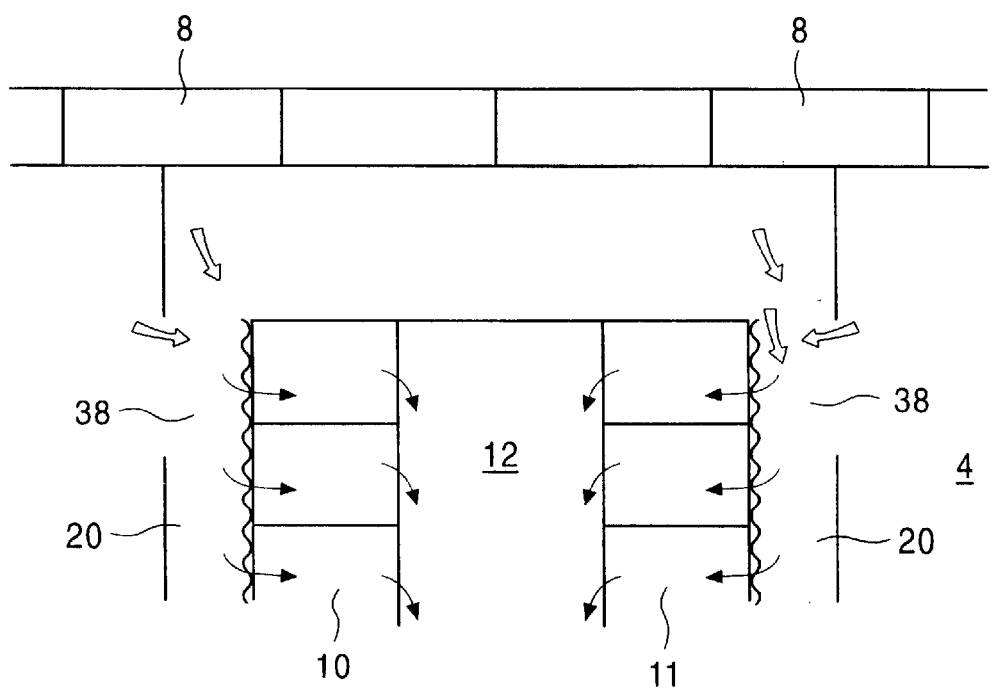
FIG. 3 is a drawing showing an air intake port in an automatic warehouse according to a second modified embodiment.

In this embodiment, a variety of modifications are possible, as shown in FIGS. 2 to 4. In the modified embodiment shown in FIG. 2, there is a gap between the top of the clean air path 20 and the ceiling of the first floor 4, making it easy to set up the automatic warehouse 2. 34 is a new air intake port.

The air in the vicinity of the top of the clean air path 20 can be regarded to be high in purity compared with the air at the lower part of each of the floors 4 and 6. In the modified embodiment shown in FIG. 3, there is an air intake port 38 leading from both rear surfaces of the automatic warehouse 2 to the clean air path 20.

In view of the flow of the clean air in FIG. 1, the quantity of the air to be introduced from the air intake port 24 to the clean air path 20 is equal to that of the air ejected from the automatic warehouse 2 to the outside. If these quantities are not equal, the air gradually accumulates in the automatic warehouse 2 or the air becomes gradually rarefied. In the modified embodiment shown in FIG. 4, in order to increase the amount of air introduced from the air intake port 24 of FIG. 1, some of the blower motors 18 disposed in an array along the bottom of the racks 10 and 11 constitute a downward blower motor 40 so as to eject more of the air in the loading space 12 down to the floor of the clean room. Instead of providing the blower motor 40 with a different orientation, the blowout direction may be oriented to be slightly downward with respect to each blower motor 18, thereby increasing the amount of air to be ejected down to the floor. By doing this, the amount of air to be ejected from the loading space 12 to the outside of the automatic warehouse 2 increases, and accordingly the amount of air to be introduced from the top of the clean air path 20 increases.

One effect of this embodiment is that even if the height of the automatic warehouse 2 is equivalent to that of the two floors 4 and 6, clean air can be supplied uniformly to the racks 10 and 11. Accordingly, the automatic warehouse 2 can be employed for carrying articles between the floor 4 and the floor 6, and a loading mechanism can also be used for these two floors 4 and 6, and the dead space at the lower part of the racks 10 and 11 and the dead space at the ceiling section can be reduced. The clean air from the blower motor 18 and the clean filter 21 and the clean air from the ceiling are supplied to the racks 10 and 11, and these clean air are supplied almost uniformly throughout the racks 10 and 11. The clean air supplied to the racks 10 and 11 is led from the loading space 12 to the blower motor 18 or the lower part of the floor surface 6, making it possible to prevent the air from settling in the upper areas of the racks 10 and 11. In particular, as shown in FIG. 4, when a part of the air in the loading space is ejected through the blower motor 40 down to the floor, the amount of clean air taken in from the air intake port can be increased without the air in the automatic warehouse 2 flowing from the station 28.

What is claimed is:

1. An automatic warehouse that has a wall facing the outside rear of a rack for forming a clean air path to the rack, the automatic warehouse comprising:

an air intake port for introducing clean air from a ceiling section of a clean room at the top of said clean air path; and a rectifying plate located on a rear side of the rack for supplying clean air to the rack;

said automatic warehouse being disposed so as to penetrate through at least two floors of the clean room, and has an entrance for carrying an article of each floor in and out.

2. An automatic warehouse as claimed in claim 1, wherein an air supply means and a filter for sucking and purifying air from a loading space in front of the rack, and for supplying air to said clean air path, wherein said air supply means and said filter are provided at the bottom of said rack.

3. An automatic warehouse as claimed in claim 1, wherein an air supply means is constructed so as to eject a part of air from a loading space in front of the rack to the outside of the automatic warehouse.

4. An automatic warehouse as claimed in claim 2, wherein an air supply means is constructed so as to eject a part of air from the loading space in front of the rack to the outside of the automatic warehouse.

5. An automatic warehouse for a clean room having an upper ceiling, a ceiling of at least one lower floor, a floor of at least one upper floor, a bottom floor, walls and an entrance on each floor, the automatic warehouse comprising:

vertical racks for supporting articles extending from a location approximate the bottom floor to a location proximate the upper ceiling, the racks are positioned to define a loading space in between two racks and positioned to define a clean air path between each rear face of the racks and the opposing wall of the automatic warehouse;

an air intake port provided in the vicinity of the upper ceiling for intaking air from an upper clean fan unit in the upper ceiling into the automatic warehouse;

the upper clean fan unit for blowing air from the upper ceiling to the floor of the at least one upper floor;

a middle clean fan unit in the ceiling of the at least one lower floor for sucking air through the floor of the at least one upper floor and blowing the air sucked through the floor of the at least one upper floor to the bottom floor;

an air supply means provided at a bottom portion of each rack for sucking air into the loading space from the clean air path and discharging air from the loading space back into the clean air path through a clean air filter; and the clean air filter for purifying air discharged from the air supply means;

wherein an air flow path is created for circulating air from the loading space through the air supply means up into the clean air path and into the loading space via the racks.

6. The automatic warehouse of claim 5, wherein the air supply means is a blower motor.

7. The automatic warehouse of claim 5, further comprising a bottom clean fan unit in the bottom floor for sucking air from the loading space through the bottom floor and blowing the air sucked through the bottom floor outside the automatic warehouse, wherein two air flows coexist, a first air flow for circulating air from the loading space through the air supply means up into the clean air path and into the loading space via the racks and a second air flow for circulating air from the loading space through the bottom floor to outside of the automatic warehouse via the bottom clean fan unit, for preventing air from settling at an upper part of the racks.

8. The automatic warehouse of claim 5, wherein the automatic warehouse has one upper floor and one lower floor.

9. The automatic warehouse of claim 5, wherein the automatic warehouse has an upper entrance on the upper floor and an entrance on the lower floor for carrying articles in and out of the automatic warehouse.

10. The automatic warehouse of claim 5, further comprising an intake port located in the vicinity of the ceiling of the lower floor.

11. The automatic warehouse of claim 5, further comprising a rectifying plate located on each rear face of the racks for treating air.

12. The automatic warehouse of claim 5, wherein the racks have a plurality of steps and a plurality of arrays.

13. The automatic warehouse of claim 5, further comprising a movable loading device located in the loading space for loading articles into the racks.

14. The automatic warehouse of claim 5, further comprising a ceiling traveling cart located on at least one ceiling for delivering articles to the automatic warehouse.

15. The automatic warehouse of claim 6 wherein some of the blower motors are positioned to blow air into the bottom floor to be ejected from the automatic warehouse to increase the amount of air ejected from the automatic warehouse and subsequently increase the amount of air introduced into the air intake port.

16. An automatic warehouse for a clean room having an upper ceiling, a ceiling of at least one lower floor, a floor of at least one upper floor, a bottom floor and walls having an air flow gap, the automatic warehouse comprising:

vertical racks for supporting articles extending from a location approximate the bottom floor to a location proximate the upper ceiling, the racks are positioned to define a loading space in between two racks and positioned to define a clean air path between each rear face of the racks and the opposing wall of the automatic warehouse;

an air intake port provided in the vicinity of the upper ceiling for intaking air from an upper clean fan unit in the upper ceiling into the automatic warehouse;

the upper clean fan unit for blowing air from the upper ceiling to the floor of the at least one upper floor;

a middle clean fan unit in the ceiling of the at least one lower floor for sucking air through the floor of the at least one upper floor and blowing the air sucked through the floor of the at least one upper floor to the bottom floor;

an air supply means provided at a bottom portion of each rack for sucking air into the loading space from the clean air path and discharging air from the loading space back into the clean air path through a clean air filter; and the clean air filter for purifying air discharged from the air supply means;

wherein an air flow path is created for circulating air from the loading space through the air supply means up into the clean air path and into the loading space via the racks.

17. The automatic warehouse of claim 16, wherein the air flow gap in the walls is located between the top of the walls and the upper ceiling.

18. The automatic warehouse of claim 16, wherein the air flow gap in the walls is located proximate the upper ceiling.

19. The automatic warehouse of claim 18, further comprising air intake ports leading from the rear surfaces of the racks to the clean air path.

\* \* \* \* \*